US010303456B2

(12) United States Patent
Hunt et al.

(10) Patent No.: US 10,303,456 B2
(45) Date of Patent: May 28, 2019

(54) TECHNOLOGIES FOR PERFORMING ENERGY EFFICIENT SOFTWARE DISTRIBUTION

(71) Applicant: Intel Corporation, Santa Clara, CA (US)

(72) Inventors: Simon Hunt, Naples, FL (US); Ned M. Smith, Beaverton, OR (US); Barry E. Huntley, Hillsboro, OR (US); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 15/466,948

(22) Filed: Mar. 23, 2017

(65) Prior Publication Data

US 2018/0275982 A1    Sep. 27, 2018

(51) Int. Cl.
*G06F 8/65*    (2018.01)
*H04L 29/08*    (2006.01)

(52) U.S. Cl.
CPC ............... *G06F 8/65* (2013.01); *H04L 67/34* (2013.01)

(58) Field of Classification Search
None
See application file for complete search history.

(56) References Cited

U.S. PATENT DOCUMENTS

| 9,135,215 | B1* | 9/2015 | Bratt | G06F 12/1027 |
|---|---|---|---|---|
| 2009/0150878 | A1* | 6/2009 | Pathak | G06F 8/65 |
| | | | | 717/172 |
| 2011/0154316 | A1* | 6/2011 | Khosravi | G06F 8/654 |
| | | | | 717/173 |
| 2012/0198435 | A1* | 8/2012 | Dirstine | G06F 8/65 |
| | | | | 717/173 |
| 2013/0326494 | A1* | 12/2013 | Nunez | H04L 41/082 |
| | | | | 717/172 |
| 2016/0094398 | A1* | 3/2016 | Choudhury | H04L 45/42 |
| | | | | 370/254 |
| 2017/0075677 | A1* | 3/2017 | Gross | G01R 31/44 |
| 2017/0357496 | A1* | 12/2017 | Smith | G06F 8/65 |
| 2018/0181762 | A1* | 6/2018 | Poornachandran | G06F 21/577 |

* cited by examiner

*Primary Examiner* — Philip Wang
*Assistant Examiner* — Rongfa P Wang
(74) *Attorney, Agent, or Firm* — Barnes & Thornburg LLP

(57) ABSTRACT

Technologies for performing energy efficient software distribution include a mesh node. The mesh node is to obtain fingerprint data of a plurality of other mesh nodes in a network. The mesh node is also to determine corresponding characteristics of the mesh nodes from the obtained fingerprint data, including an energy status of each of the mesh nodes. The mesh node is also to perform an analysis of a software update, determine, as a function of the analysis of the software update, one or more target mesh nodes of the plurality of mesh nodes for the software update, and determine a path through the mesh nodes to the one or more target mesh nodes as a function of the fingerprint data. Other embodiments are also described and claimed.

25 Claims, 9 Drawing Sheets

TECHNOLOGIES FOR PERFORMING ENERGY EFFICIENT SOFTWARE DISTRIBUTION

BACKGROUND

In systems that include multiple Internet-of-Things (IoT) devices (also referred to herein as "mesh nodes"), a centralized Internet Protocol (IP) network is typically not used to transmit software updates to the IoT devices because the various IoT devices often use different communication protocols and network fabrics. Furthermore, in such systems, one or more of the IoT devices may only be active and communicating on the network for brief periods of time, such as to periodically transmit data collected by sensors of the IoT device or to receive data collected by sensors of another IoT device. Additionally, the IoT devices may have low data transmission power thereby limiting their range and may operate from one or more batteries with infrequent opportunities to recharge the batteries. As such, distributing a software update to one or more target IoT devices through a network of IoT devices that have only periodic availability on the network and limited energy can be challenging and may result in substantial delays and/or significant energy depletion for IoT devices in the network to provide the software update to the target IoT device(s).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
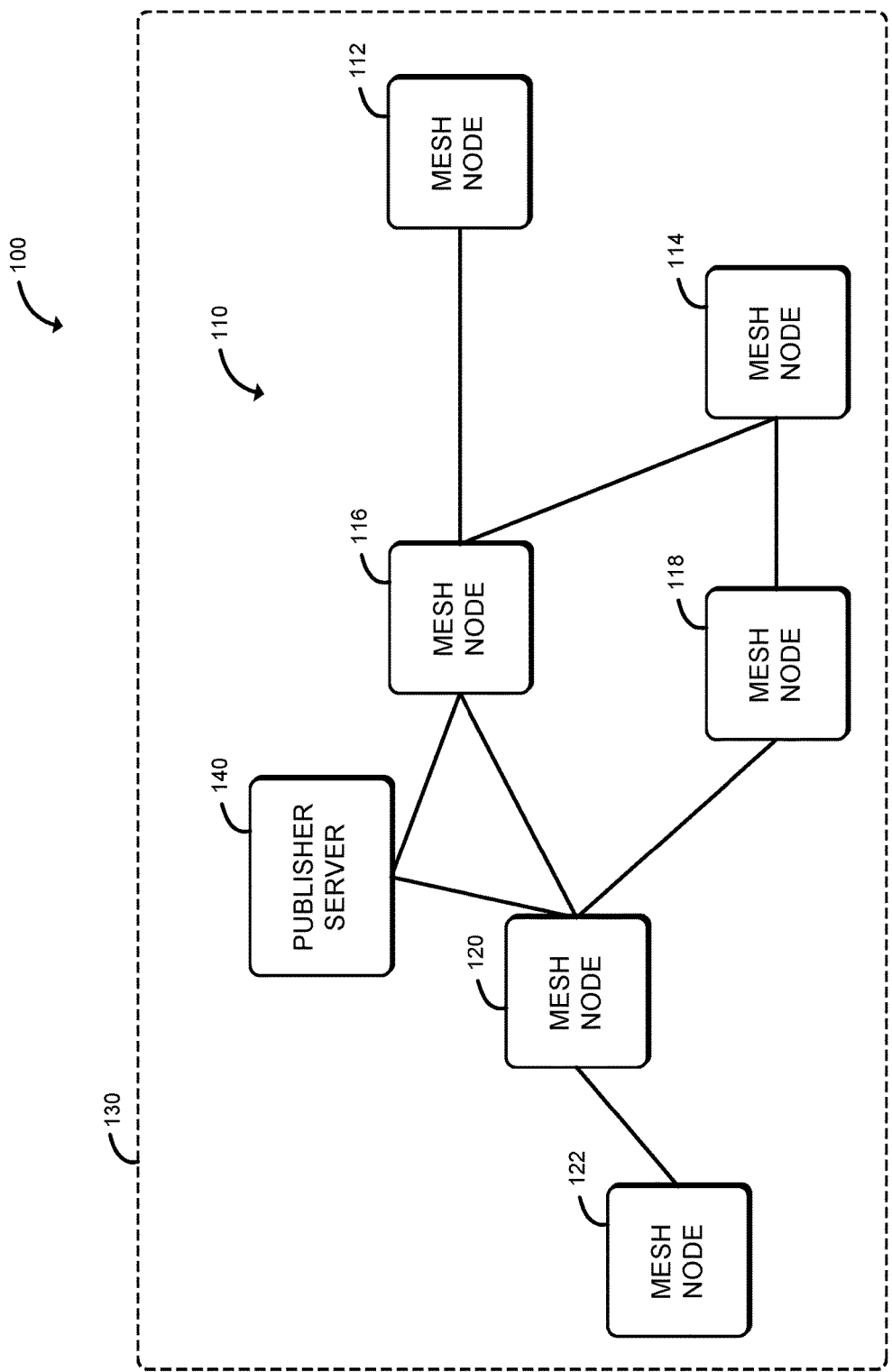
FIG. 1 is a simplified block diagram of at least one embodiment of a system for performing energy efficient software distribution among a network of mesh nodes.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As shown in FIG. 1, an illustrative system 100 for performing energy efficient software distribution includes a set of mesh nodes 110 in communication via a network 130, which in the illustrative embodiment has a mesh network topology. The set of mesh nodes 110 includes mesh nodes 112, 114, 116, 118, 120, and 122. While six mesh nodes 110 are shown in the set, it should be understood that in other embodiments, the set may include a different number of mesh nodes 110. Additionally, the system 100 includes a publisher server 140 which may provide a software update to one of the mesh nodes 110 for distribution through the network 130 to one or more target mesh nodes 110 to which the software update pertains. In operation, the mesh nodes 110 share fingerprint data with each other. The fingerprint data may be embodied as any data indicative of characteristics of the corresponding mesh node 110, including an energy status of the mesh node (e.g., whether the mesh node 110 is operating on battery power, a depletion level of the battery, an availability of a power source to charge the battery, etc.) as well as other characteristics such as a software version executed by the mesh node 110, a type of the mesh node 110 (e.g., a motion detection mesh node, a door lock mesh node, etc.), and/or the sensors included in the mesh node 110 (e.g., a motion sensor, a temperature sensor, etc.). In the illustrative embodiment, a mesh node 110 that receives the software update from the publisher server 140 may analyze characteristics of the software update, compare the characteristics of the software update to the characteristics of the mesh nodes 110 (i.e., determined from the fingerprint data) to determine which mesh node(s)

110 the software update pertains to (referred to herein as "target mesh nodes"), and determine a path to through the network 130 to provide the software update to the target mesh node(s) in view of the energy status data of the mesh nodes 110. As such, the mesh node 110 may determine a path that avoids mesh nodes 110 that have a relatively low amount of available battery energy and that have infrequent access to a power source to recharge their batteries. Routing the path around such mesh nodes 110 may enable those mesh nodes 110 to conserve their energy for normal sensor data gathering and reporting operations rather than expending their energy on transmitting the software update. Doing so may also reduce delays in providing the software update to the target mesh node(s), as the mesh nodes 110 with low battery energy and/or infrequent access to a power source to recharge their batteries may be operating in a low power mode in which the mesh nodes 110 infrequently access the network 130 to transmit or receive data. In some embodiments, the mesh node 110 may adjust the path as a function of a criticality of the software update, to expedite delivery of the software update to one or more target mesh nodes 110 at the cost of reduced energy efficiency.

Figure 2:
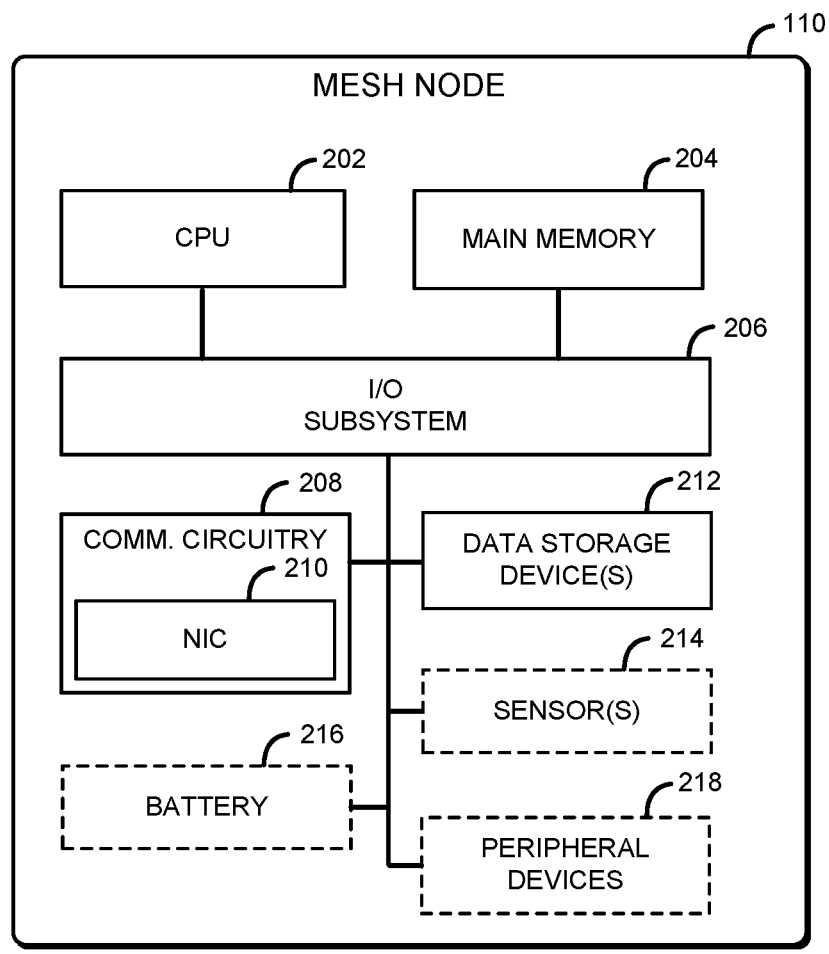
FIG. 2 is a simplified block diagram of at least one embodiment of a mesh node of the system of FIG. 1.

Referring now to FIG. 2, each mesh node 110 may be embodied as any type of compute device capable of performing the functions described herein, including reporting fingerprint data to other mesh nodes, analyzing fingerprint data to determine characteristics of mesh nodes 110, receiving a software update, determining one or more target mesh nodes to which the software update is applicable based on the fingerprint data, and determining a path through the network 130 to the target mesh nodes as a function of energy status characteristics indicated in the fingerprint data from the other mesh nodes 110. As shown in FIG. 2, the illustrative mesh node 110 includes a central processing unit (CPU) 202, a main memory 204, an input/output (I/O) subsystem 206, communication circuitry 208, one or more data storage devices 212. Of course, in other embodiments, the mesh node 110 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 204, or portions thereof, may be incorporated in the CPU 202.

The CPU 202 may be embodied as any type of processor capable of performing the functions described herein. The CPU 202 may be embodied as a single or multi-core processor(s), a microcontroller, or other processor or processing/controlling circuit. In some embodiments, the CPU 202 may be embodied as, include, or be coupled to a field programmable gate array (FPGA), an application specific integrated circuit (ASIC), reconfigurable hardware or hardware circuitry, or other specialized hardware to facilitate performance of the functions described herein. Similarly, the main memory 204 may be embodied as any type of volatile (e.g., dynamic random access memory (DRAM), etc.) or non-volatile memory or data storage capable of performing the functions described herein. In some embodiments, all or a portion of the main memory 204 may be integrated into the CPU 202. In operation, the main memory 204 may store various software and data used during operation such as software update data, mesh node data, model data, operating systems, applications, programs, libraries, and drivers.

The I/O subsystem 206 may be embodied as circuitry and/or components to facilitate input/output operations with the CPU 202, the main memory 204, and other components of the mesh node 110. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the CPU 202, the main memory 204, and other components of the mesh node 110, on a single integrated circuit chip.

The communication circuitry 208 may be embodied as any communication circuit, device, or collection thereof, capable of enabling communications over the network 130 between the mesh node 110 and another device (e.g., the publisher server 140 and/or another mesh node 110). The communication circuitry 208 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 208 includes a network interface called (NIC) 210. The NIC 210 may be embodied as one or more add-in-boards, daughtercards, network interface cards, controller chips, chipsets, or other devices that may be used by the mesh node 110 to connect with another device (e.g., the publisher server 140 and/or another mesh node 110) and transmit or receive data. In some embodiments, NIC 210 may be embodied as part of a system-on-a-chip (SoC) that includes one or more processors, or included on a multichip package that also contains one or more processors. In some embodiments, the NIC 210 may include a local processor (not shown) and/or a local memory (not shown) that are both local to the NIC 210. In such embodiments, the local processor of the NIC 210 may be capable of performing one or more of the functions of the CPU 202 described herein. Additionally or alternatively, in such embodiments, the local memory of the NIC 210 may be integrated into one or more components of the mesh node 110 at the board level, socket level, chip level, and/or other levels.

The one or more illustrative data storage devices 212 may be embodied as any type of devices configured for short-term or long-term storage of data such as, for example, memory devices and circuits, memory cards, hard disk drives, solid-state drives, or other data storage devices. Each data storage device 212 may include a system partition that stores data and firmware code for the data storage device 212. Each data storage device 212 may also include an operating system partition that stores data files and executables for an operating system.

Additionally, the mesh node 110 may include one or more sensors 214 which each may be embodied as any device capable of sensing one or more conditions (e.g., a temperature, motion, etc.) in an environment of the sensor 214 and generating data indicative of the sensed conditions. Further, the mesh node 110 may include a battery 216 which may be embodied as any device capable of storing energy for use by the mesh node 110 to perform operations (e.g., receiving and transmitting data, generating sensor data, etc.) and which may be recharged by an another power source (e.g., an alternating current (AC) power source, a photovoltaic device, etc.).

The mesh node 110 may additionally or alternatively include one or more peripheral devices 218. Such peripheral devices 218 may include any type of peripheral device commonly found in a compute device such as a display, speakers, a mouse, a keyboard, and/or other input/output devices, interface devices, and/or other peripheral devices.

The publisher server 140 may have components similar to those described in FIG. 2. The description of those components are equally applicable to the description of components of the mesh node 110 and is not repeated herein for clarity of the description, with the exception that the publisher server 140, in the illustrative embodiment, does not include the sensors 214 described above. Further, it should be appreciated that the publisher server 140 may include other components, sub-components, and devices commonly found in a computing device, which are not discussed above in reference to the mesh node 110 and not discussed herein for clarity of the description.

As described above, the mesh nodes 110 and the publisher server 140 are illustratively in communication via the network 130, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof. In the illustrative embodiment, the network 130 has a mesh network topology in which each device (e.g., mesh node 110) may cooperate in relaying data to one or more other devices (e.g., other mesh nodes 110).

Figure 3:
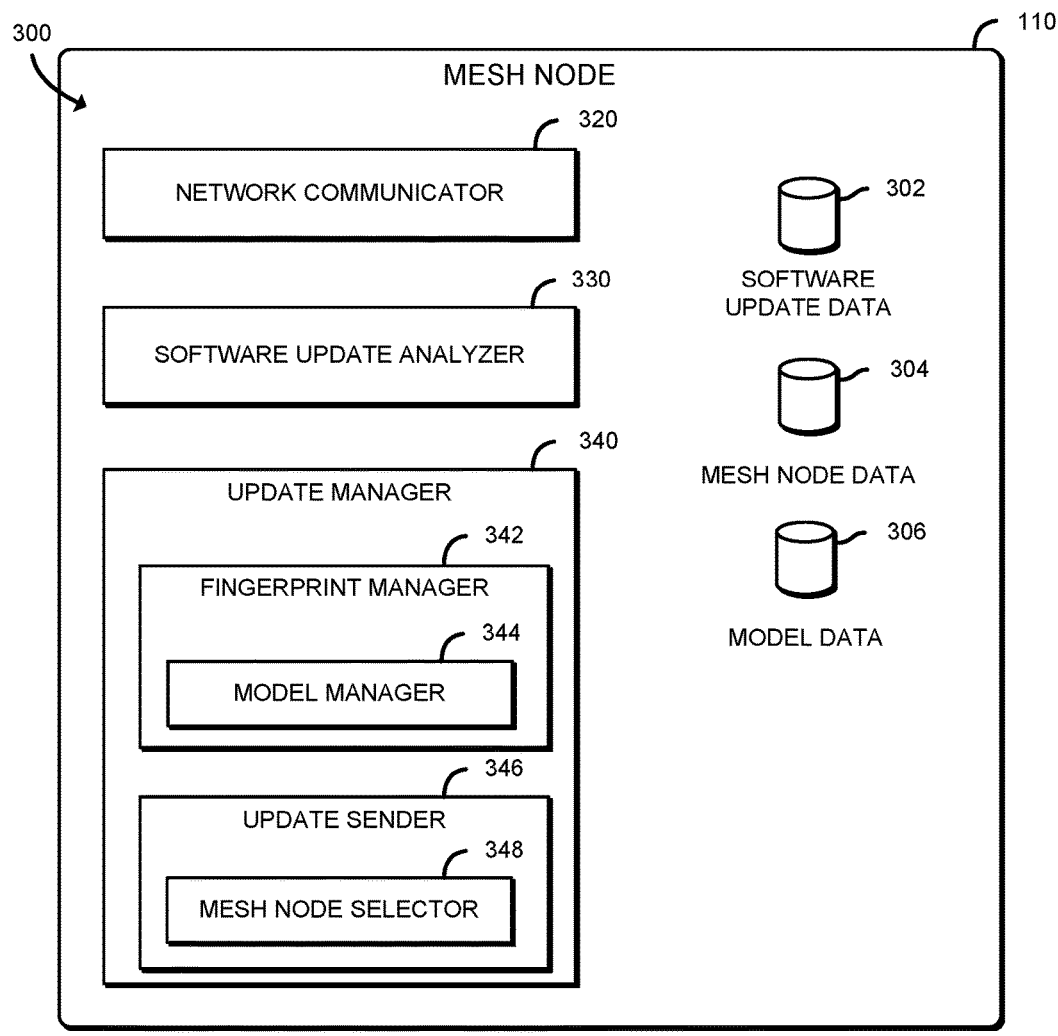
FIG. 3 is a simplified block diagram of an environment that may be established by a mesh node of FIGS. 1 and 2.

Referring now to FIG. 3, in the illustrative embodiment, the mesh node 110 may establish an environment 300 during operation. The illustrative environment 300 includes a network communicator 320, a software update analyzer 330, and an update manager 340. Each of the components of the environment 300 may be embodied as hardware, firmware, software, or a combination thereof. As such, in some embodiments, one or more of the components of the environment 300 may be embodied as circuitry or a collection of electrical devices (e.g., network communicator circuitry 320, software update analyzer circuitry 330, update manager circuitry 340, etc.). It should be appreciated that, in such embodiments, one or more of the network communicator circuitry 320, the software update analyzer circuitry 330, or the update manager circuitry 340 may form a portion of one or more of the CPU 202, the main memory 204, the I/O subsystem 206, the communication circuitry 208, and/or other components of the mesh node 110. In the illustrative embodiment, the environment 300 includes software update data 302 which may be embodied as any data indicative of one or more software updates (e.g., source code, object code, patches, etc.), and characteristics of the software updates (e.g., a software version, a node type to which the software update pertains, a sensor type to which the software update pertains, a criticality of the software update, such as high criticality for a security update, a medium criticality for an efficiency improvement, or a low criticality for a user interface enhancement, etc.). In some embodiments, the software update data 302 may include a Bloom value for each software update, which may be embodied as a probabilistic data structure usable to test whether an element (e.g., a Bloom filter of a mesh node 110) is a member of a set (e.g., a set of mesh nodes 110 to which the software update is applicable), and which is indicative of the characteristics of the corresponding software update.

The environment 300, in the illustrative embodiment, additionally includes mesh node data 304 which may be embodied as any data indicative of identifiers of the mesh nodes 110 in the network 130 and fingerprint data indicative of characteristics of each mesh node 110 (e.g., the energy status of each mesh node 110, a software version executed by each mesh node 110, a type of each mesh node 110, identifications of types of sensors 214 included in each mesh node 110). In some embodiments, the fingerprint data for each mesh node 110 may be encoded in a Bloom filter. Additionally, in the illustrative embodiment, the environment 300 includes model data 306 which may be embodied as any data indicative of models that may be used by the mesh node 110 to estimate dynamic fingerprint data (e.g., a present energy battery depletion) of another mesh node 110 and/or to determine whether to expire (e.g., reduce a confidence level of) fingerprint data pertaining to one or more mesh nodes 110. The models may be predefined models provided to the mesh node 110 through the network 130 from another mesh node 110 and/or may be probabilistic models trained by the present mesh node 110 based on fingerprint data previously received from the mesh node 110 being modeled (e.g., trained on previous updates of battery depletion over time, etc.).

In the illustrative environment 300, the network communicator 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the mesh node 110, respectively. To do so, the network communicator 320 is configured to receive and process data packets from one system or device (e.g., another mesh node 110 or the publisher server 140) and to prepare and send data packets to another device (e.g., another mesh node 110). Accordingly, in some embodiments, at least a portion of the functionality of the network communicator 320 may be performed by the communication circuitry 208, and, in the illustrative embodiment, by the NIC 210.

The software update analyzer 330, which may be embodied as hardware, firmware, software, virtualized hardware, emulated architecture, and/or a combination thereof as discussed above, is configured to analyze a software update obtained by the mesh node 110 (e.g., from the publisher server 140) and determine the characteristics of the software update (e.g., by reading metadata included with the software update).

The update manager 340, which may be embodied as hardware, firmware, software, virtualized hardware, emulated architecture, and/or a combination thereof as discussed above, is configured to obtain fingerprint data of the mesh nodes 110, determine which of the mesh nodes are target mesh nodes for an obtained software update, and determine a path through the network 130 to route the software update to the target mesh nodes as a function of the fingerprint data (e.g., energy status data) of the mesh nodes 110. To do so, in the illustrative embodiment, the update manager 340 includes a fingerprint manager 342 and an update sender 346. The fingerprint manager 342, in the illustrative embodiment, is configured to generate fingerprint data of the present mesh node 110, receive fingerprint data from other mesh nodes 110 through the network 130, locally estimate fingerprint data using one or more models in the model data 306, and relay the fingerprint data to other mesh nodes 110 in the network. Further, in the illustrative embodiment, the fingerprint manager 342 includes a model manager 344 that is configured to select, apply, and/or train a model of a mesh node 110 to estimate frequently changing data (referred to herein as dynamic fingerprint data), such as a present battery depletion. As such, the model manager 344 may enable the present mesh node 110 to determine fingerprint data for another mesh node 110 in instances where the present mesh node 110 has not received updated fingerprint data for that particular mesh node 110. The update sender 346, in the illustrative embodiment, is configured to determine which mesh nodes 110 are target mesh nodes 110 for a given software update and determine the path through the network 130 to provide the software update to the target mesh nodes 110 as a function of the fingerprint data (e.g., the energy status data). To do so, in the illustrative embodiment, the update sender 346 includes a mesh node selector 348 that is configured to compare the characteristics of the software update to the characteristics of the mesh nodes 110, as indicated in the fingerprint data, to determine which of the mesh nodes 110 the software update applies to (e.g., which mesh nodes 110 are of a type that the software update applies to and which of the mesh nodes 110 are executing a software version that is older than the version of the software update). In doing so, the mesh node selector 348 may compare a Bloom publication value indicative of the software update characteristics to a Bloom filter of each mesh node 110 to determine whether the software update applies to the corresponding mesh node 110. Additionally, the update sender 346 is configured to send the software update to the next mesh node 110 in the path. In doing so, the update sender 346 may additionally provide a set of routing rules to the other mesh nodes 110 to indicate which mesh nodes 110 are in the determined path. In other embodiments, each mesh node 110 is configured to determine the next mesh node 110 in the path using the analysis described herein.

It should be appreciated that each of the fingerprint manager 342, the model manager 344, the update sender 346, and the mesh node selector 348 may be separately embodied as hardware, firmware, software, virtualized hardware, emulated architecture, and/or a combination thereof. For example, the fingerprint manager 342 may be embodied as a hardware component, while the model manager 344, the update sender 346, and the mesh node selector 348 are embodied as virtualized hardware components or as some other combination of hardware, firmware, software, virtualized hardware, emulated architecture, and/or a combination thereof.

Figure 4:
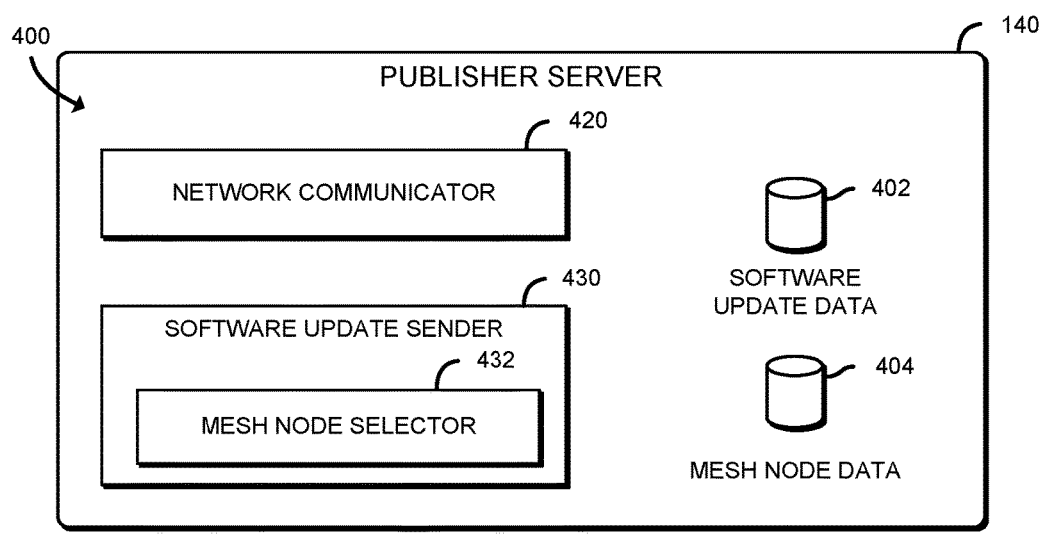
FIG. 4 is a simplified block diagram of an environment that may be established by a publisher server of FIG. 1.

Referring now to FIG. 4, in the illustrative embodiment, the publisher server 140 may establish an environment 400 during operation. The illustrative environment 400 includes a network communicator 420 and a software update sender 430. Each of the components of the environment 400 may be embodied as hardware, firmware, software, or a combination thereof. As such, in some embodiments, one or more of the components of the environment 400 may be embodied as circuitry or a collection of electrical devices (e.g., network communicator circuitry 420, software update sender circuitry 430, etc.). It should be appreciated that, in such embodiments, one or more of the network communicator circuitry 420 or the software update sender circuitry 430 may form a portion of one or more of the CPU 202, the main memory 204, the I/O subsystem 206, the communication circuitry 208, and/or other components of the publisher server 140. In the illustrative embodiment, the environment 400 includes software update data 402, similar to the software update data 302 of FIG. 3. As such, the software update data 402 may be embodied as any data indicative of one or more software updates (e.g., source code, object code, patches, etc.), and characteristics of the software updates (e.g., a software version, a node type to which the software update pertains, a sensor type to which the software update pertains, a criticality of the software update such as high criticality for a security update, a medium criticality for an efficiency improvement, or a low criticality for a user interface enhancement). In some embodiments, the software update data 302 may include a Bloom value for each software update, which may be embodied as a probabilistic data structure usable to test whether an element (e.g., a Bloom filter of a mesh node 110) is a member of a set (e.g., a set of mesh nodes 110 to which the software update is applicable), and which is indicative of the characteristics of the corresponding software update. Additionally, the environment 400, in the illustrative embodiment, includes mesh node data 404, similar to the mesh node data 304 of FIG. 3. As such, in the illustrative embodiment, the mesh node data 404 includes any data indicative of identifiers of the mesh nodes 110 in the network 130 and fingerprint data indicative of characteristics of each mesh node 110. In some embodiments, the fingerprint data for each mesh node 110 may be encoded in a Bloom filter.

In the illustrative environment 400, the network communicator 420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the publisher server 140, respectively. To do so, the network communicator 420 is configured to receive and process data packets from one system or device (e.g., a mesh node 110) and to prepare and send data packets to a device (e.g., a mesh node 110). Accordingly, in some embodiments, at least a portion of the functionality of the network communicator 420 may be performed by the communication circuitry 208, and, in the illustrative embodiment, by the NIC 210.

The software update sender 430, which may be embodied as hardware, firmware, software, virtualized hardware, emulated architecture, and/or a combination thereof as discussed above, is configured to generate and store the characteristics of a software update in association with the software update in the software update data 402 and send the software update data 402 (e.g., the software update itself and characteristics of the software update) to a mesh node 110 for distribution through the network 130 to one or more target mesh nodes. In the illustrative embodiment, the software update sender 430 includes a mesh node selector 432. The mesh node selector 432, in the illustrative embodiment, is configured to select a mesh node 110 to send the software update data 402 to. In doing so, the mesh node selector 432 may select a mesh node 110 that has characteristics that indicate that the software update would be applicable to the mesh node 110 or to another mesh node 110 connected to the mesh node 110, such as by comparing a Bloom filter of the mesh node 110 to a publication Bloom value of the software update to determine whether there is a match, or by selecting a mesh node 110 having a Bloom filter that is primarily (e.g., more than half of the bits) set to one.

Figure 5:
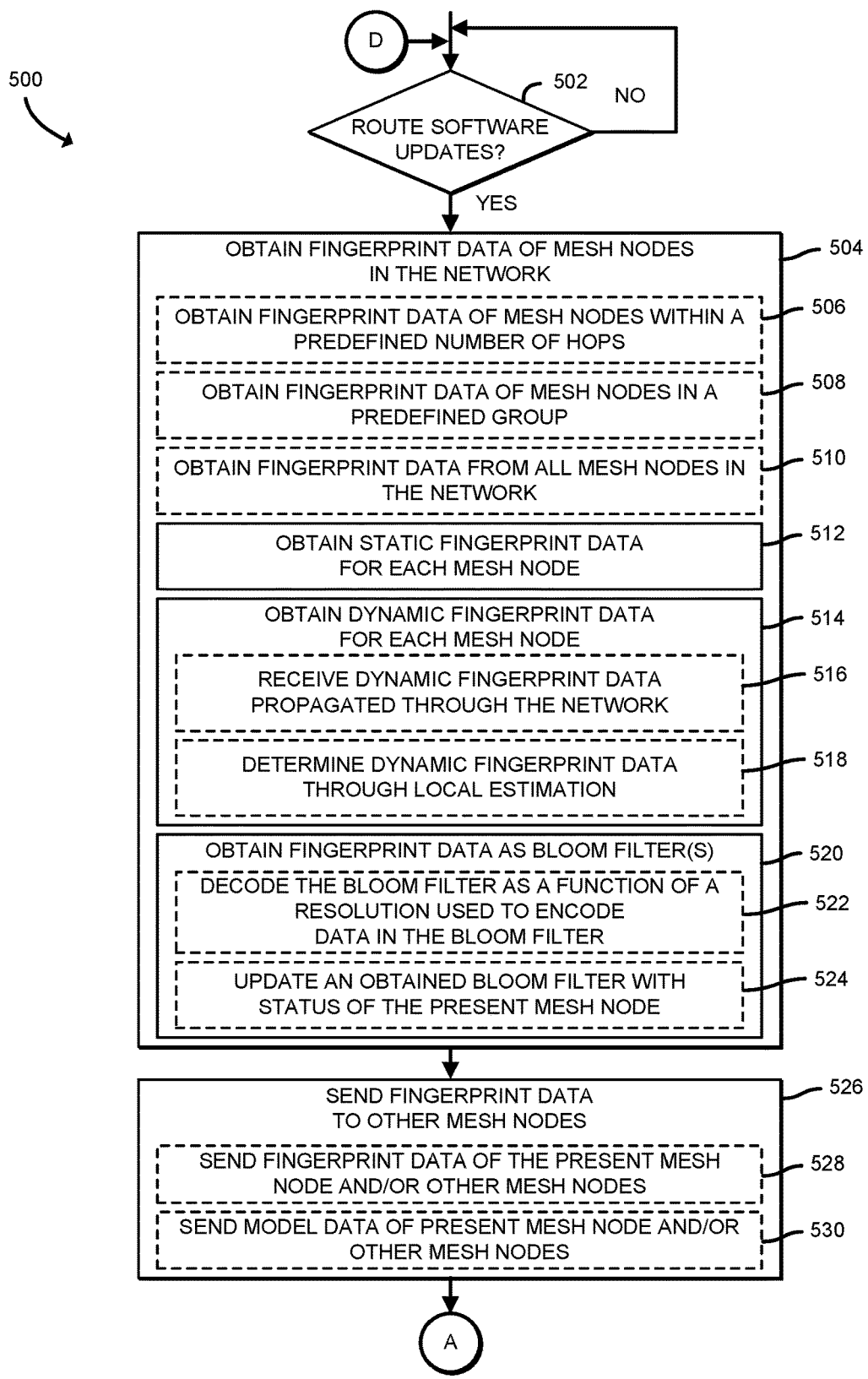
FIGS. 5-8 are a simplified flow diagram of at least one embodiment of a method for routing a software update that may be performed by a mesh node of FIGS. 1 and 2.

Referring now to FIG. 5, in use, a mesh node 110 may execute a method 500 for routing software updates through the network 130 to one or more target mesh nodes 110. The method 500 begins with block 502 in which the mesh node 110 determines whether to route software updates. In the illustrative embodiment, the mesh node 110 determines to route software updates if the mesh node 110 is powered on and in communication with one or more other mesh nodes 110 of the network 130. In other embodiments, the mesh node 110 determines whether to route software updates based on other factors. Regardless, in response to a determination to route software updates, the method 500 advances to block 504 in which the mesh node 110 obtains fingerprint data of the mesh nodes 110 in the network 130. In doing so, the mesh node 110 may obtain fingerprint data of mesh nodes 110 within a predefined number of hops (e.g., one or two hops) of the present mesh node 110, as indicated in block 506. Additionally or alternatively, the mesh node 110 may obtain fingerprint data of other mesh nodes 110 in a predefined group, such as a group of mesh nodes 110 assigned to a particular function or geographic area, as indicated in block 508. In some embodiments, the mesh node 110 may obtain fingerprint data from all of the mesh nodes 110 in the network 130, as indicated in block 510. In obtaining the fingerprint data, the present mesh node 110, in the illustrative embodiment and as indicated in block 512, obtains static fingerprint data indicative of characteristics of the mesh nodes 110 that typically change infrequently or not at all, such as the type of the mesh node 110, the number and types of sensors included in the mesh node 110, and a version of software (e.g., operating system, application, driver, etc.) executed by the mesh node 110. Additionally, in the illustrative embodiment, the mesh node 110 obtains dynamic fingerprint data for each mesh node 110 as indicated in block 514.

The dynamic fingerprint data may be embodied as any data that may change continually, such as an energy status of the mesh node 110 (e.g., a depletion level of the battery 216, etc.) and/or a present load (e.g., a present network bandwidth of the mesh node 110). In obtaining the dynamic fingerprint data, the mesh node 110 may obtain dynamic fingerprint data propagated through the network (e.g., relayed by various mesh nodes 110 to the present mesh node 110) as indicated in block 516 and/or may determine dynamic fingerprint data through local estimation, as indicated in block 518. In obtaining the dynamic fingerprint data through local estimation, the present mesh node 110 may utilize a model (e.g., the model data 306) of the mesh node 110 whose dynamic fingerprint data is to be determined, such as a model of battery depletion over time. As indicated in block 520, in obtaining the fingerprint data, the mesh node 110 may obtain the fingerprint data as a Bloom filter, in which one or more bits are set to represent a different characteristic. Accordingly, the present mesh node 110 may decode the characteristics as a function of a predefined resolution (e.g., number of bits) used to encode each characteristic in the Bloom filter, as indicated in block 522. Additionally, the present mesh node 110 may update the Bloom filter obtained from one of the mesh nodes 110 with status data of the present mesh node 110, as indicated in block 524.

Subsequently, the method 500 advances to block 526, in which the mesh node 110 sends the obtained fingerprint data to other mesh nodes 110 in the network 130. In sending the fingerprint data, the present mesh node 110 may send fingerprint data of the present mesh node 110 along with the fingerprint data of other mesh nodes 110 (e.g., the fingerprint data obtained in block 504), as indicated in block 528. Additionally, in the illustrative embodiment, the present mesh node 110 may send model data 306 of the present mesh node 110 (e.g., a predefined model of changes in the dynamic fingerprint data over time) or over other mesh nodes 110 with the fingerprint data, as indicated in block 530. Subsequently, the method 500 advances to block 532 of FIG. 6, in which the present mesh node 110, in the illustrative embodiment, expires (e.g., sets an expiration status, such as a confidence value) of the fingerprint data.

Figure 6:
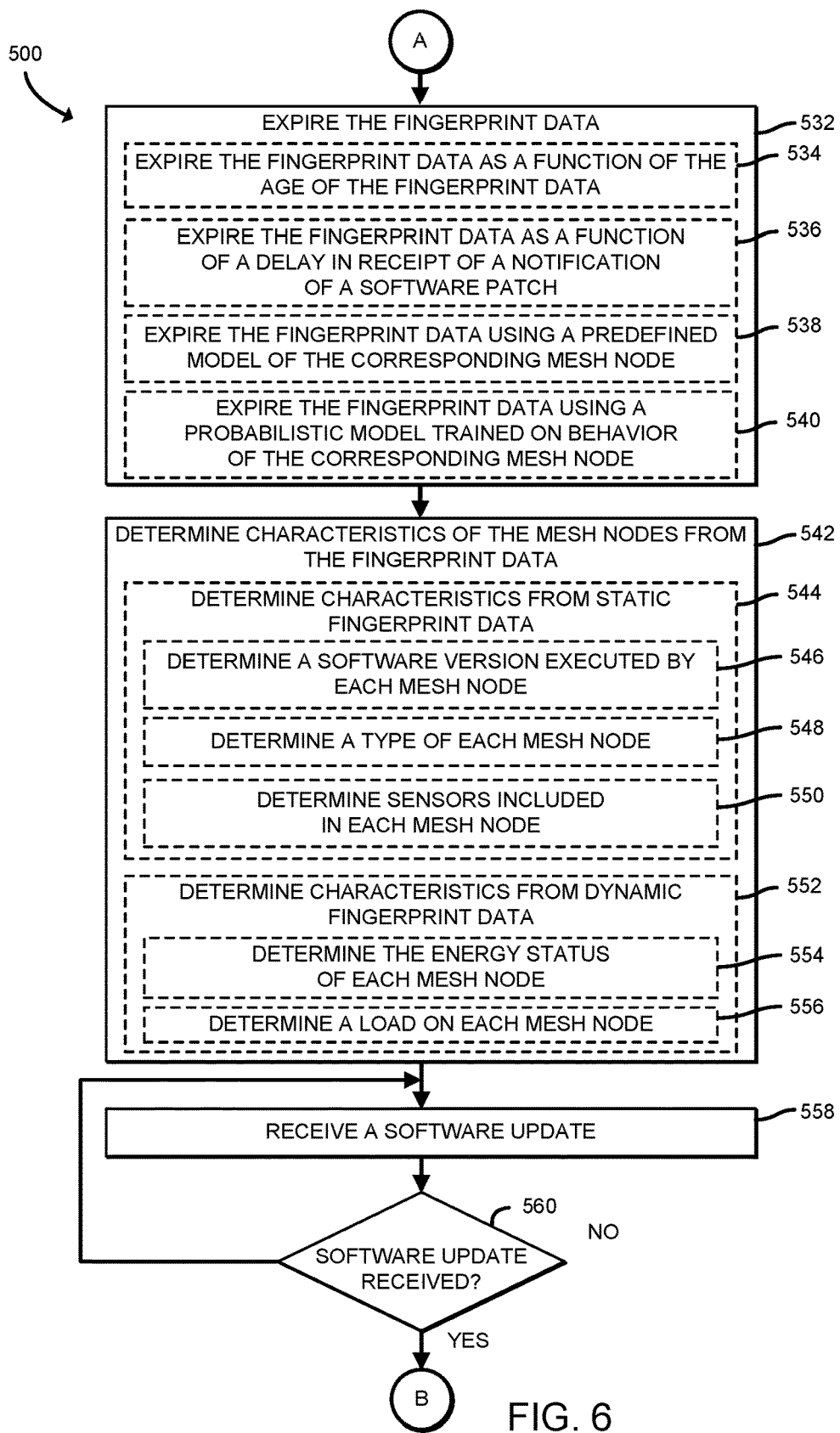

Referring now to FIG. 6, in expiring the fingerprint data, the present mesh node 110 may expire the fingerprint data as a function of the age of the fingerprint data, as indicated in block 534. For example, the present mesh node 110 may iteratively decrease a confidence value included in or associated with the fingerprint data of a mesh node 110 until the present mesh node 110 receives updated fingerprint data associated with the corresponding mesh node 110. Additionally or alternatively, as indicated in block 536, the mesh node 110 may expire fingerprint data as a function of a delay in receipt of a notification that a particular mesh node 110 has applied a particular software update (e.g., a software patch) to itself when that software update is available in the network 130. As indicated in block 538, the present mesh node 110 may expire the fingerprint data using a predefined model of the corresponding mesh node 110, such as by decreasing a confidence value at a rate of battery level depletion indicated by a predefined model of the corresponding mesh node 110. Similarly, as indicated in block 540, the present mesh node 110 may expire the fingerprint data using a probabilistic model that has been trained on behavior (e.g., earlier dynamic fingerprint data) of the corresponding mesh node 110.

Afterwards, the method 500 advances to block 542 in which the present mesh node 110 determines characteristics of the mesh nodes 110 from the fingerprint data. In doing so, the present mesh node 110 may determine characteristics from the static fingerprint data, as indicated in block 544. In determining the characteristics from the static fingerprint data, the present mesh node 110 may determine a software version executed by each mesh node 110, as indicated in block 546. Additionally or alternatively, in determining the characteristics from the data fingerprint data, the present mesh node 110 may determine a type of each mesh node 110, as indicated in block 548. The present mesh node 110 may additionally or alternatively determine information indicative of one or more sensors 214 included in each mesh node 110, as indicated in block 550. In determining the characteristics, the present mesh node 110 may parse a code, such as a numeric value included in the fingerprint data, indicative of each characteristic. Additionally, in the illustrative embodiment, the present mesh node 110 determines characteristics from the dynamic fingerprint data, as indicated in block 552. In doing so, the present mesh node 110 may determine the energy status (e.g., present battery depletion level) of each mesh node 110, as indicated in block 554. The present mesh node 110 may additionally determine a load on each mesh node 110, such as a present bandwidth of each mesh node 110, as indicated in block 556.

Subsequently, in the illustrative embodiment, the present mesh node 110 receives a software update (e.g., from the publisher server 140 or from another mesh node 110). In block 560, the present mesh node 110 determines whether a software update has been received. If not, the method 500 loops back to block 558 in which the present mesh node 110 awaits a software update. Otherwise, the method 500 advances to block 562 of FIG. 7, in which the mesh node 110 analyzes the software update to determine characteristics of the software update.

Figure 7:
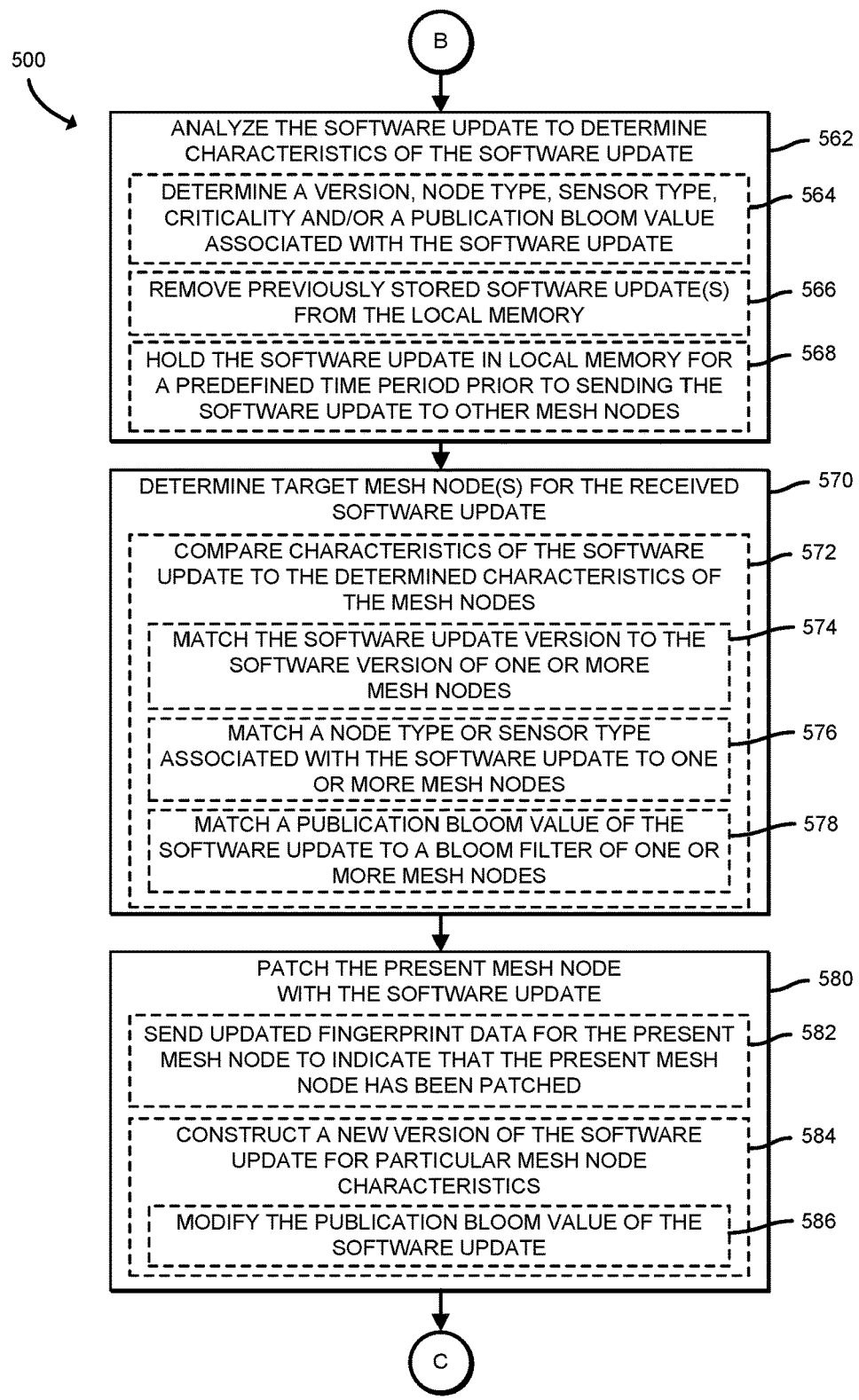

Referring now to FIG. 7, in analyzing the software update, the present mesh node 110 may determine a version, a node type, a sensor type, a criticality (e.g., high criticality, medium criticality, low criticality, etc.) and/or a publication Bloom value associated with the software update, as indicated in block 564. As described above, in the illustrative embodiment, the characteristics are included with the software update (e.g., as metadata). In the illustrative embodiment, as indicated in block 566, the mesh node 110 may remove one or more previously stored software updates from the local memory of the present mesh node (e.g., based on a least recently used scheme, a first in, first out scheme, or any other scheme). The mesh node 110 may hold the software update in the local memory for a predefined time period (e.g., a time period specified in metadata included with the software update, a time period defined in a configuration file of the present mesh node 110, etc.) prior to sending the software update to any other mesh nodes 110, as indicated in block 568. In some embodiments, the software update may include a manifest which may be embodied as any data indicative of one or more signatures of files, packages, modules or other components of the software update (e.g., a software update image). In other embodiments, the manifest may be provided separately from the software update. In some embodiments, the mesh node 110 may verify the integrity of the contents of the components of the software update as a function of the one or more signatures included in the manifest. The signer of the components of the software update may be a root, global or central trusted entity (e.g., the publisher server 140) or a trusted peer node (e.g., another mesh node 110), where trust is established through a variety of key exchange mechanisms. The key exchange mechanisms may include exchange of certificates using an enrollment process, such as Simple Certificate Enrollment Protocol (SCEP), Public Key Cryptography Standards #10 (PKCS#10), or a signed Diffie-Hellman key exchange that involves digital signing using asymmetric signatures or symmetric signatures (e.g., a hash message authentication code or cipher-based message authentication code). A manufacturer's certificate may be used to sign the manifest, including, for example, an Intel Enhanced Privacy ID signing key (e.g., an Intel Sigma protocol). Additionally or alternatively, a Transport Layer Security (TLS) cipher suite (e.g., TLS-ECDH-ECDSA-WITH-AES-128-GCM-SHA256) or a key management provider (e.g., a Kerberos or Radius server) may be used to establish symmetric signing keys.

In block 570, the present mesh node 110 determines one or more target mesh nodes for the received software update. In doing so and as indicated in block 572, the present mesh node 110 may the compare characteristics of the software update (e.g., from block 562) to the determined characteristics of the mesh nodes 110 (e.g., from block 542). In the illustrative embodiment, the present mesh node 110 may match the software update version to the software version of one or more of the mesh nodes 110, as indicated in block 574. Additionally or alternatively, the present mesh node 110 may match a node type or sensor type associated with the software update to one or more of the mesh nodes 110, as indicated in block 576. As indicated in block 578, the present mesh node 110 may additionally or alternatively match the publication Bloom value of the software update to a Bloom filter of one or more of the mesh nodes 110 to determine whether the software update is applicable to one or more of the mesh nodes 110.

Subsequently, as indicated in block 580, the present mesh node 110 may patch itself with the software update (e.g., if the present mesh node 110 is of a type that the software update pertains to and if the present software version executed by the present mesh node 110 is older than the version of the software update). Further, as indicated in block 582, the present mesh node 110 may send updated fingerprint data of itself to other mesh nodes 110 in the network 130 to indicate that the present mesh node 110 has patched its software with the software update. As indicated in block 584, the present mesh node 110 may construct a new version of the software update for a particular set of mesh node characteristics. For example, the software update may initially be embodied at least partially as source code that can be compiled into different object code depending on the particular types of sensors 214 included in a mesh node 110. As such, the present mesh node 110 may compile the source code for the sensors 214 included in the present mesh node 110, thereby constructing a new version of the software update for use by other mesh nodes 110 that include the same sensors 214 as the present mesh node 110. Additionally, as indicated in block 586, the present mesh node 110 may modify the publication Bloom value of the software update (e.g., to indicate that the new version applies to mesh nodes 110 that include the specific set of sensors 214). Subsequently, the method 500 advances to block 588 of FIG. 8 in which the mesh node 110 determines a path to route the software update through the target mesh nodes 110.

Figure 8:
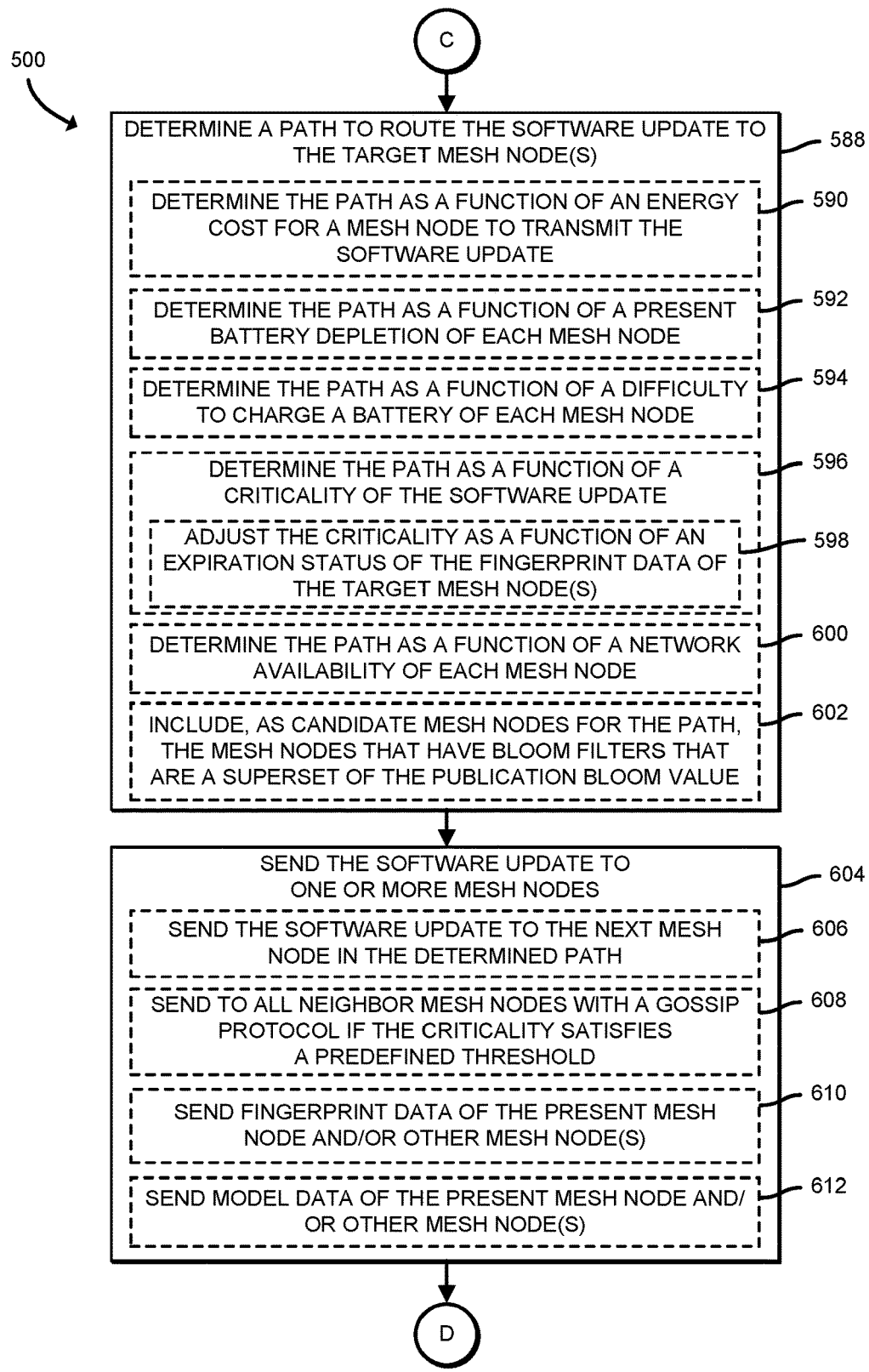

Referring now to FIG. 8, in determining the path, the mesh node 110 may determine the path as a function of an energy cost for each mesh node 110 in the network to transmit the software update, as indicated in block 590. For example, some types of mesh nodes 110 may be equipped with less efficient transmitters, be located in more remote areas (e.g., necessitating greater transmission power), and/or be equipped with smaller batteries such that transmitting the software update may cause more significant battery depletion for those mesh nodes 110 than for other types of mesh nodes 110 in the network 130. The present mesh node 110, in the illustrative embodiment, also determines the path as a function of the present battery depletion of each mesh node 110, as indicated in block 592. Accordingly, the present mesh node 110 may determine that the path should avoid mesh nodes 110 that are within a predefined level (e.g., less than 20%) of their total battery capacity, to enable those mesh nodes 110 to focus their remaining energy on recording and reporting sensor data or performing other functions, rather than expending energy to transmit the update through the network 130. As indicated in block 594, the present mesh node 110 may determine the path as a function of a difficulty to charge the battery of each mesh node 110. For example, some types of mesh nodes 110 may typically be located in areas where a power mains in not readily available, and instead are charged from a photovoltaic device that infrequently receives light. As such, the present mesh node 110 may determine to route the software update around such mesh nodes 110 if other mesh nodes 110 with more energy and/or better access to a power source are available. The present mesh node 110 may additionally determine the path as a function of the criticality of the software update, as indicated in block 596. Accordingly, while a less direct route that passes through mesh nodes 110 having relatively abundant energy may be available, if the criticality of the software update satisfies a predefined threshold (e.g., a high criticality), the present mesh node 110 may determine to route the software update through a more direct route at the cost of more significantly depleting the batteries of the mesh nodes 110 in the path.

As indicated in block 598, the present mesh node 110 may adjust the criticality of the software update (e.g., adjust the criticality that was originally indicated in the characteristics of the software update in block 562) as a function of the expiration status of the fingerprint data of the target mesh nodes 110. For example, if the expiration status indicates a low confidence (e.g., the target mesh nodes 110 have not reported their fingerprint data within a threshold amount of time because they are potentially low on energy and/or are otherwise functioning abnormally), the mesh node 110 may increase the criticality of the update in order to provide the software update to the target mesh nodes 110 faster (e.g., along a more direct route). Additionally, the mesh node 110 may determine the path as a function of the network availability of each mesh node 110, as indicated in block 600. For example, some types of mesh nodes 110 may communicate on the network 130 less often than other mesh nodes 110 in order to conserve energy. As such, these mesh nodes 110 may reduce the speed at which a software update may be delivered to a target mesh node 110 and the present mesh node 110 may route around these mesh nodes 110 or include them in the path, depending on the criticality of the software update. As indicated in block 602, the present mesh node 110 may include, as candidate mesh nodes for the path, mesh nodes 110 that have a Bloom filters that are a superset of the publication Bloom value associated with the software update.

Subsequently, in block 604, the present mesh node 110 sends the software update to one or more of the mesh nodes 110. In doing so, as indicated in block 606, the present mesh node 110 may send the software update to the next mesh node 110 in the path that was determined in block 588. Alternatively, as indicated in block 608, the present mesh node 110 may send the software update to all neighboring mesh nodes 110 (e.g., all mesh nodes 110 within one hop of the present mesh node 110) using a gossip protocol, such as if the criticality of the software update satisfies a predefined threshold (e.g., if the criticality is high). In sending the software update, the present mesh node 110 may also send fingerprint data of itself and/or of other mesh nodes 110 (e.g., to propagate the fingerprint data through the network 130), as indicated in block 610. Similarly, the present mesh node 110 may send model data 306 of the present mesh node and/or other mesh nodes 110 with the software update (e.g., to propagate the model data 306 through the network 130). Subsequently, the method 500 loops back to block 502 of FIG. 5, in which the present mesh node 110 determines whether to route other software updates through the network 130.

Figure 9:
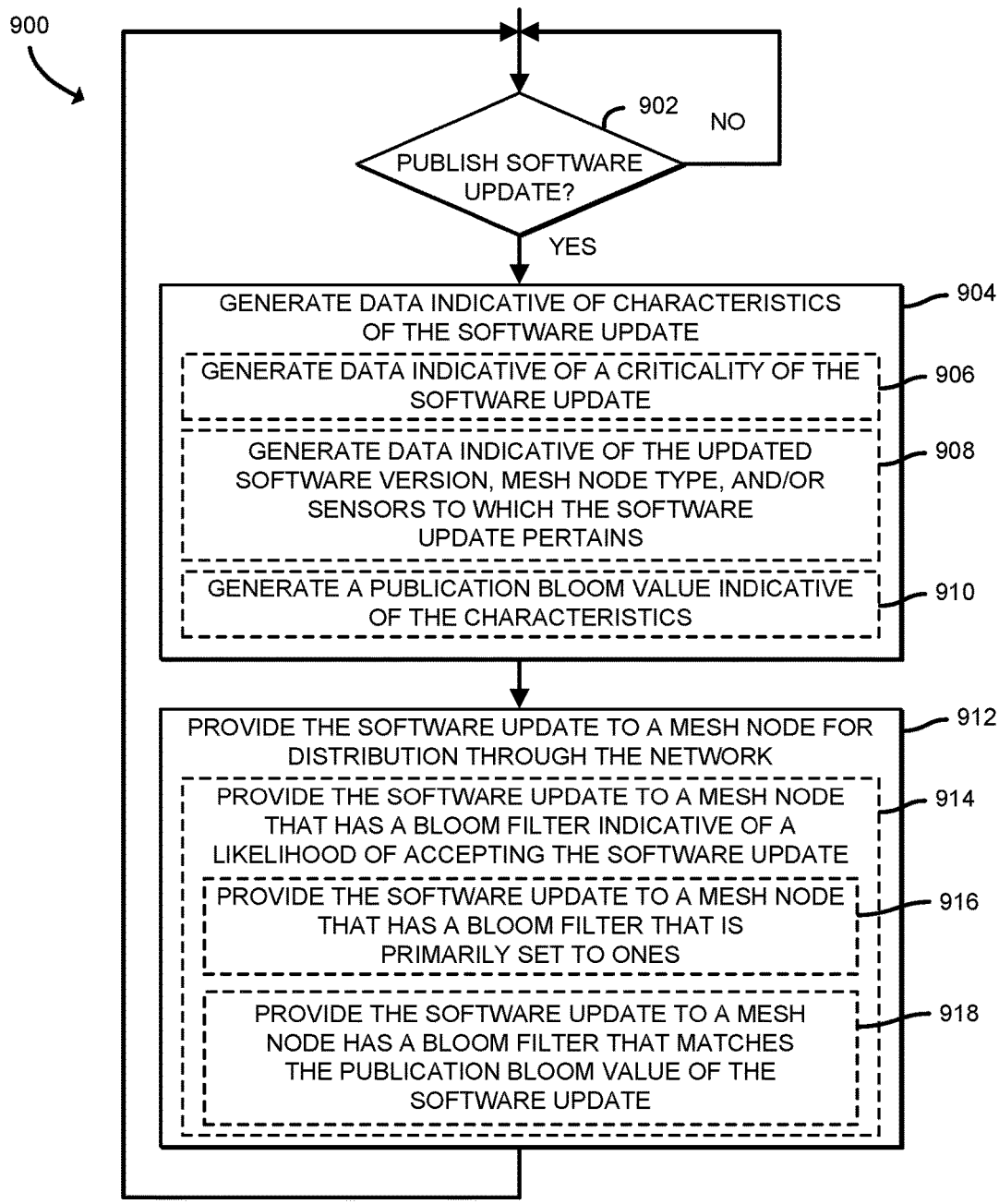
FIG. 9 is a simplified block diagram of at least one embodiment of a method for publishing a software update that may be performed by the publisher server of FIG. 1.

Referring now to FIG. 9, in use, the publisher server 140 may execute a method 900 for publishing a software update. The method 900 begins with block 902 in which the publisher server 140 determines whether to publish a software update. In the illustrative embodiment, the publisher server 140 determines to publish a software update if the publisher server 140 is connected to at least one mesh node 110 of the network 130 and has, in the software update data 402, a software update that has not yet been sent to any of the mesh nodes 110. In other embodiments, the publisher server 140 may determine whether to publish a software update based on other factors. Regardless, in response to a determination to publish a software update, the method 900 advances to block 904 in which the publisher server 140 generates data indicative of characteristics of the software update. The publisher server 140 may receive the data from a developer of the software update and/or may analyze a header or other portion of the software update for flags, symbols, or other indicia of the characteristics. In generating the data indicative of the characteristics, the publisher server 140 may generate data indicative of a criticality of the software update (e.g., low, medium, high, etc.), as indicated in block 906. Additionally, as indicated in block 908, the publisher server 140 may generate data indicative of the version of the software update, a type of mesh node to which the update pertains, and/or one or more types of sensors to which the software update pertains, as indicated in block 908. In generating the data indicative of the characteristics, the publisher server 140 may generate a publication Bloom value indicative of the characteristics, as indicated in block 910, or may otherwise encode the characteristics in metadata associated with the software update.

As indicated in block 912, the publisher server 140, in the illustrative embodiment, provides the software update to a mesh node 110 for distribution through the network 130. In doing so, the publisher server 140 may provide the software update to a mesh node that has a Bloom filter indicative of a threshold likelihood of accepting the software update, as indicated in block 914. For example, and as indicated in block 916, the publisher server 140 may provide the software update to a mesh node 110 that has a Bloom filter that is primarily (e.g., at least half of the bits) set to one. As another example, and as indicated in block 918, the publisher server 140 may provide the software update to a mesh node 110 that has a Bloom filter that matches (e.g., is equal to) the publication Bloom value of the software update. Subsequently, the method 900 loops back to block 902 in which the publisher server 140 again determines whether to publish a software update.

EXAMPLES

Illustrative examples of the technologies disclosed herein are provided below. An embodiment of the technologies may include any one or more, and any combination of, the examples described below.

Example 1 includes a mesh node for distributing a software update, the mesh node comprising an update manager to obtain fingerprint data of a plurality of other mesh nodes in a network and determine corresponding characteristics of the mesh nodes from the obtained fingerprint data, wherein the determined characteristics include an energy status of each of the mesh nodes; and a software update analyzer to perform an analysis of a software update, wherein the update manager is further to determine, as a function of the analysis of the software update, one or more target mesh nodes of the plurality of mesh nodes for the software update, and determine a path through the mesh nodes to the one or more target mesh nodes as a function of the fingerprint data.

Example 2 includes the subject matter of Example 1, and wherein the software update analyzer is further to determine a criticality of the software update; and wherein to determine the path through the mesh nodes comprises to determine the path additionally as a function of the determined criticality of the software update.

Example 3 includes the subject matter of any of Examples 1 and 2, and wherein to determine the path to the one or more target mesh nodes comprises to determine the path additionally as a function of an energy cost for one or more of the mesh nodes to transmit the software update.

Example 4 includes the subject matter of any of Examples 1-3, and wherein to obtain the fingerprint data comprises to obtain a Bloom filter associated with each mesh node.

Example 5 includes the subject matter of any of Examples 1-4, and wherein to determine the characteristics from the fingerprint data comprises to determine at least one of a software version executed by each mesh node, a type of each mesh node, or one or more sensors included in each mesh node; and wherein to determine one or more target mesh nodes comprises to compare characteristics of the software update to one or more of the software version, the type, and the one or more sensors of each mesh node.

Example 6 includes the subject matter of any of Examples 1-5, and wherein the update manager is further to send the software update to the one or more target mesh nodes through the determined path.

Example 7 includes the subject matter of any of Examples 1-6, and wherein to determine the path to the one or more target mesh nodes comprises to determine the path additionally as a function of a network availability of one or more of the mesh nodes and as a function of a criticality of the software update.

Example 8 includes the subject matter of any of Examples 1-7, and wherein the update manager is further to determine an expiration status of the fingerprint data of one or more of the mesh nodes; and adjust the criticality of the software update as a function of the expiration status of the fingerprint data.

Example 9 includes the subject matter of any of Examples 1-8, and wherein to obtain the fingerprint data comprises to estimate dynamic fingerprint data of one or more of the mesh nodes.

Example 10 includes the subject matter of any of Examples 1-9, and wherein the update manager is further to determine an expiration status of the fingerprint data as a function of a predefined model of one or more of the mesh nodes; and determine a criticality of the software update as a function of the expiration status of the fingerprint data.

Example 11 includes the subject matter of any of Examples 1-10, and wherein to obtain the fingerprint data comprises to obtain a Bloom filter for each of the plurality of mesh nodes; and wherein to determine the path comprises to identify, as candidate mesh nodes for the path, one or more mesh nodes associated with Bloom filters that are a superset of a publication Bloom value of the software update.

Example 12 includes the subject matter of any of Examples 1-11, and wherein the update manager is further to patch the mesh node with the software update; and send updated fingerprint data of the mesh node to one or more of the other mesh nodes.

Example 13 includes the subject matter of any of Examples 1-12, and wherein the update manager is further to determine whether a criticality of the software update satisfies a predefined threshold; and send, in response to a determination that the criticality satisfies the predefined threshold, the software update with a gossip protocol.

Example 14 includes the subject matter of any of Examples 1-13, and wherein the update manager is further to send, with the software update, fingerprint data of the mesh node to one or more of the other mesh nodes.

Example 15 includes the subject matter of any of Examples 1-14, and wherein the software update analyzer is further to verify an integrity of the software update with a manifest that includes one or more signatures for one or more components of the software update.

Example 16 includes a method for distributing a software update, the method comprising obtaining, by a mesh node, fingerprint data of a plurality of other mesh nodes in a network; determining, by the mesh node, corresponding characteristics of the mesh nodes from the obtained fingerprint data, wherein the determined characteristics include an energy status of each of the mesh nodes; performing, by the mesh node, an analysis of a software update, determining, by the mesh node and as a function of the analysis of the software update, one or more target mesh nodes of the plurality of mesh nodes for the software update; and determining, by the mesh node, a path through the mesh nodes to the one or more target mesh nodes as a function of the fingerprint data.

Example 17 includes the subject matter of Example 16, and further including determining, by the mesh node, a criticality of the software update; and wherein determining the path through the mesh nodes comprises determining the path additionally as a function of the determined criticality of the software update.

Example 18 includes the subject matter of any of Examples 16 and 17, and wherein determining the path to the one or more target mesh nodes comprises determining the path additionally as a function of an energy cost for one or more of the mesh nodes to transmit the software update.

Example 19 includes the subject matter of any of Examples 16-18, and wherein obtaining the fingerprint data comprises obtaining a Bloom filter associated with each mesh node.

Example 20 includes the subject matter of any of Examples 16-19, and wherein determining the characteristics from the fingerprint data comprises determining at least one of a software version executed by each mesh node, a type of each mesh node, or one or more sensors included in each mesh node; and wherein determining one or more target mesh nodes comprises comparing characteristics of the software update to one or more of the software version, the type, and the one or more sensors of each mesh node.

Example 21 includes the subject matter of any of Examples 16-20, and further including sending, by the mesh node, the software update to the one or more target mesh nodes through the determined path.

Example 22 includes the subject matter of any of Examples 16-21, and wherein determining the path to the one or more target mesh nodes comprises determining the path additionally as a function of a network availability of one or more of the mesh nodes and as a function of a criticality of the software update.

Example 23 includes the subject matter of any of Examples 16-22, and further including determining, by the mesh node, an expiration status of the fingerprint data of one or more of the mesh nodes; and adjusting, by the mesh node, the criticality of the software update as a function of the expiration status of the fingerprint data.

Example 24 includes the subject matter of any of Examples 16-23, and wherein obtaining the fingerprint data comprises estimating dynamic fingerprint data of one or more of the mesh nodes.

Example 25 includes the subject matter of any of Examples 16-24, and further including determining, by the mesh node, an expiration status of the fingerprint data as a function of a predefined model of one or more of the mesh nodes; and determining, by the mesh node, a criticality of the software update as a function of the expiration status of the fingerprint data.

Example 26 includes the subject matter of any of Examples 16-25, and wherein obtaining the fingerprint data comprises obtaining a Bloom filter for each of the plurality of mesh nodes; and wherein determining the path comprises identifying, as candidate mesh nodes for the path, one or more mesh nodes associated with Bloom filters that are a superset of a publication Bloom value of the software update.

Example 27 includes the subject matter of any of Examples 16-26, and further including patching the mesh node with the software update; and sending updated fingerprint data of the mesh node to one or more of the other mesh nodes.

Example 28 includes the subject matter of any of Examples 16-27, and further including determining, by the mesh node, whether a criticality of the software update satisfies a predefined threshold; and sending, by the mesh node and in response to a determination that the criticality satisfies the predefined threshold, the software update with a gossip protocol.

Example 29 includes the subject matter of any of Examples 16-28, and further including sending, with the software update, fingerprint data of the mesh node to one or more other mesh nodes.

Example 30 includes the subject matter of any of Examples 16-29, and further including verifying, by the mesh node, an integrity of the software update with a manifest that includes one or more signatures for one or more components of the software update.

Example 31 includes one or more machine-readable storage media comprising a plurality of instructions stored thereon that, in response to being executed, cause a mesh node to perform the method of any of Examples 16-30.

Example 32 includes a mesh node for distributing a software update, the mesh node comprising means for obtaining fingerprint data of a plurality of other mesh nodes in a network; means for determining corresponding characteristics of the mesh nodes from the obtained fingerprint data, wherein the determined characteristics include an energy status of each of the mesh nodes; means for performing an analysis of a software update, means for determining, as a function of the analysis of the software update, one or more target mesh nodes of the plurality of mesh nodes for the software update; and means for determining a path through the mesh nodes to the one or more target mesh nodes as a function of the fingerprint data.

Example 33 includes the subject matter of Example 32, and further including means for determining a criticality of the software update; and wherein the means for determining the path through the mesh nodes comprises means for determining the path additionally as a function of the determined criticality of the software update.

Example 34 includes the subject matter of any of Examples 32 and 33, and wherein the means for determining the path to the one or more target mesh nodes comprises means for determining the path additionally as a function of an energy cost for one or more of the mesh nodes to transmit the software update.

Example 35 includes the subject matter of any of Examples 32-34, and wherein the means for obtaining the fingerprint data comprises means for obtaining a Bloom filter associated with each mesh node.

Example 36 includes the subject matter of any of Examples 32-35, and wherein the means for determining the characteristics from the fingerprint data comprises means for determining at least one of a software version executed by each mesh node, a type of each mesh node, or one or more sensors included in each mesh node; and wherein the means for determining one or more target mesh nodes comprises means for comparing characteristics of the software update to one or more of the software version, the type, and the one or more sensors of each mesh node.

Example 37 includes the subject matter of any of Examples 32-36, and further including means for sending the software update to the one or more target mesh nodes through the determined path.

Example 38 includes the subject matter of any of Examples 32-37, and wherein the means for determining the path to the one or more target mesh nodes comprises means for determining the path additionally as a function of a network availability of one or more of the mesh nodes and as a function of a criticality of the software update.

Example 39 includes the subject matter of any of Examples 32-38, and further including means for determining an expiration status of the fingerprint data of one or more of the mesh nodes; and means for adjusting the criticality of the software update as a function of the expiration status of the fingerprint data.

Example 40 includes the subject matter of any of Examples 32-39, and wherein the means for obtaining the fingerprint data comprises means for estimating dynamic fingerprint data of one or more of the mesh nodes.

Example 41 includes the subject matter of any of Examples 32-40, and further including means for determining an expiration status of the fingerprint data as a function of a predefined model of one or more of the mesh nodes; and means for determining a criticality of the software update as a function of the expiration status of the fingerprint data.

Example 42 includes the subject matter of any of Examples 32-41, and wherein the means for obtaining the fingerprint data comprises means for obtaining a Bloom filter for each of the plurality of mesh nodes; and wherein the means for determining the path comprises means for identifying, as candidate mesh nodes for the path, one or more mesh nodes associated with Bloom filters that are a superset of a publication Bloom value of the software update.

Example 43 includes the subject matter of any of Examples 32-42, and further including means for patching the mesh node with the software update; and means for sending updated fingerprint data of the mesh node to one or more of the other mesh nodes.

Example 44 includes the subject matter of any of Examples 32-43, and further including means for determining whether a criticality of the software update satisfies a predefined threshold; and means for sending, in response to a determination that the criticality satisfies the predefined threshold, the software update with a gossip protocol.

Example 45 includes the subject matter of any of Examples 32-44, and further including means for sending, with the software update, fingerprint data of the mesh node to one or more other mesh nodes.

Example 46 includes the subject matter of any of Examples 32-45, and further including means for verifying an integrity of the software update with a manifest that includes one or more signatures for one or more components of the software update.

Example 47 includes a publisher server for providing a software update, the publisher server comprising a software update sender to generate data indicative characteristics of a software update, wherein the characteristics include a criticality of the software update; and a network communicator to provide the software update to a mesh node for distribution through a network.

Example 48 includes the subject matter of Example 47, and wherein to generate data indicative of characteristics of the software update comprises to generate data indicative of at least one of a version of the software update, a mesh node type associated with the software update, or one or more sensors to which the software update pertains.

Example 49 includes the subject matter of any of Examples 47 and 48, and wherein to generate data indicative of characteristics of the software update comprises to generate a publication Bloom value indicative of the characteristics.

Example 50 includes the subject matter of any of Examples 47-49, and wherein to provide the software update to a mesh node comprises to provide the software update to a mesh node that has a Bloom filter indicative of a predefined likelihood that the mesh node will accept the software update.

Example 51 includes the subject matter of any of Examples 47-50, and wherein to provide the software update to a mesh node that has a Bloom filter indicative of a predefined likelihood that the mesh node will accept the software update comprises to provide the software update to a mesh node that has a Bloom filter that is primarily set to ones.

Example 52 includes the subject matter of any of Examples 47-51, and wherein to provide the software update to a mesh node that has a Bloom filter indicative of a predefined likelihood that the mesh node will accept the software update comprises to provide the software update to a mesh node that has a Bloom filter that matches a publication Bloom value of the software update.

Example 53 includes a method for providing a software update, the method comprising generating, by a publisher server, data indicative characteristics of a software update, wherein the characteristics include a criticality of the software update; and providing, by the publisher server, the software update to a mesh node for distribution through a network.

Example 54 includes the subject matter of Example 53, and wherein generating data indicative of characteristics of the software update comprises generating data indicative of at least one of a version of the software update, a mesh node type associated with the software update, or one or more sensors to which the software update pertains.

Example 55 includes the subject matter of any of Examples 53 and 54, and wherein generating data indicative of characteristics of the software update comprises generating a publication Bloom value indicative of the characteristics.

Example 56 includes the subject matter of any of Examples 53-55, and wherein providing the software update to a mesh node comprises providing the software update to a mesh node that has a Bloom filter indicative of a predefined likelihood that the mesh node will accept the software update.

Example 57 includes the subject matter of any of Examples 53-56, and wherein providing the software update to a mesh node that has a Bloom filter indicative of a predefined likelihood that the mesh node will accept the software update comprises providing the software update to a mesh node that has a Bloom filter that is primarily set to ones.

Example 58 includes the subject matter of any of Examples 53-57, and wherein providing the software update to a mesh node that has a Bloom filter indicative of a predefined likelihood that the mesh node will accept the software update comprises providing the software update to a mesh node that has a Bloom filter that matches a publication Bloom value of the software update.

Example 59 includes one or more machine-readable storage media comprising a plurality of instructions stored thereon that, in response to being executed, cause a publisher server to perform the method of any of Examples 53-58.

Example 60 includes a publisher server for providing a software update, the publisher server comprising means for generating data indicative characteristics of a software update, wherein the characteristics include a criticality of the software update; and means for providing the software update to a mesh node for distribution through a network.

Example 61 includes the subject matter of Example 60, and wherein the means for generating data indicative of characteristics of the software update comprises means for generating data indicative of at least one of a version of the software update, a mesh node type associated with the software update, or one or more sensors to which the software update pertains.

Example 62 includes the subject matter of any of Examples 60 and 61, and wherein the means for generating data indicative of characteristics of the software update comprises means for generating a publication Bloom value indicative of the characteristics.

Example 63 includes the subject matter of any of Examples 60-62, and wherein the means for providing the software update to a mesh node comprises means for providing the software update to a mesh node that has a Bloom filter indicative of a predefined likelihood that the mesh node will accept the software update.

Example 64 includes the subject matter of any of Examples 60-63, and wherein the means for providing the software update to a mesh node that has a Bloom filter indicative of a predefined likelihood that the mesh node will accept the software update comprises means for providing the software update to a mesh node that has a Bloom filter that is primarily set to ones.

Example 65 includes the subject matter of any of Examples 60-64, and wherein the means for providing the software update to a mesh node that has a Bloom filter indicative of a predefined likelihood that the mesh node will accept the software update comprises means for providing the software update to a mesh node that has a Bloom filter that matches a publication Bloom value of the software update.

The invention claimed is:

1. A mesh node for distributing a software update, the mesh node comprising:
   an update manager to obtain fingerprint data of a plurality of other mesh nodes in a network and determine corresponding characteristics of the mesh nodes from the obtained fingerprint data, wherein the determined characteristics include an energy status of each of the mesh nodes; and
   a software update analyzer to perform an analysis of a software update,
   wherein the update manager is further to determine, as a function of the analysis of the software update, one or more target mesh nodes of the plurality of mesh nodes for the software update, and determine a path through the mesh nodes to the one or more target mesh nodes as a function of the fingerprint data.

2. The mesh node of claim 1, wherein the software update analyzer is further to determine a criticality of the software update; and
   wherein to determine the path through the mesh nodes comprises to determine the path additionally as a function of the determined criticality of the software update.

3. The mesh node of claim 1, wherein to determine the path to the one or more target mesh nodes comprises to determine the path additionally as a function of an energy cost for one or more of the mesh nodes to transmit the software update.

4. The mesh node of claim 1, wherein to obtain the fingerprint data comprises to obtain a Bloom filter associated with each mesh node.

5. The mesh node of claim 1, wherein to determine the characteristics from the fingerprint data comprises to determine at least one of a software version executed by each mesh node, a type of each mesh node, or one or more sensors included in each mesh node; and wherein to determine one or more target mesh nodes comprises to compare characteristics of the software update to one or more of the software version, the type, and the one or more sensors of each mesh node.

6. The mesh node of claim 1, wherein the update manager is further to send the software update to the one or more target mesh nodes through the determined path.

7. The mesh node of claim 1, wherein to determine the path to the one or more target mesh nodes comprises to determine the path additionally as a function of a network availability of one or more of the mesh nodes and as a function of a criticality of the software update.

8. The mesh node of claim 7, wherein the update manager is further to:

determine an expiration status of the fingerprint data of one or more of the mesh nodes; and adjust the criticality of the software update as a function of the expiration status of the fingerprint data.

9. The mesh node of claim 1, wherein to obtain the fingerprint data comprises to estimate dynamic fingerprint data of one or more of the mesh nodes.

10. One or more non-transitory machine-readable storage media comprising a plurality of instructions stored thereon that, in response to being executed, cause a mesh node to:

obtain fingerprint data of a plurality of other mesh nodes in a network;

determine corresponding characteristics of the mesh nodes from the obtained fingerprint data, wherein the determined characteristics include an energy status of each of the mesh nodes;

perform an analysis of a software update, determine, as a function of the analysis of the software update, one or more target mesh nodes of the plurality of mesh nodes for the software update; and determine a path through the mesh nodes to the one or more target mesh nodes as a function of the fingerprint data.

11. The one or more non-transitory machine-readable storage media of claim 10, wherein, when executed, the plurality of instructions further cause the mesh node to:

determine a criticality of the software update; and wherein to determine the path through the mesh nodes comprises to determine the path additionally as a function of the determined criticality of the software update.

12. The one or more non-transitory machine-readable storage media of claim 10, wherein to determine the path to the one or more target mesh nodes comprises to determine the path additionally as a function of an energy cost for one or more of the mesh nodes to transmit the software update.

13. The one or more non-transitory machine-readable storage media of claim 10, wherein to obtain the fingerprint data comprises to obtain a Bloom filter associated with each mesh node.

14. The one or more non-transitory machine-readable storage media of claim 10, wherein to determine the characteristics from the fingerprint data comprises to determine at least one of a software version executed by each mesh node, a type of each mesh node, or one or more sensors included in each mesh node; and wherein to determine one or more target mesh nodes comprises to compare characteristics of the software update to one or more of the software version, the type, and the one or more sensors of each mesh node.

15. The one or more non-transitory machine-readable storage media of claim 10, wherein, when executed, the plurality of instructions further cause the mesh node to send the software update to the one or more target mesh nodes through the determined path.

16. The one or more non-transitory machine-readable storage media of claim 10, wherein to determine the path to the one or more target mesh nodes comprises to determine the path additionally as a function of a network availability of one or more of the mesh nodes and as a function of a criticality of the software update.

17. The one or more non-transitory machine-readable storage media of claim 16, wherein, when executed, the plurality of instructions further cause the mesh node to:

determine an expiration status of the fingerprint data of one or more of the mesh nodes; and adjust the criticality of the software update as a function of the expiration status of the fingerprint data.

18. A method for distributing a software update, the method comprising:

obtaining, by a mesh node, fingerprint data of a plurality of other mesh nodes in a network;

determining, by the mesh node, corresponding characteristics of the mesh nodes from the obtained fingerprint data, wherein the determined characteristics include an energy status of each of the mesh nodes;

performing, by the mesh node, an analysis of a software update, determining, by the mesh node and as a function of the analysis of the software update, one or more target mesh nodes of the plurality of mesh nodes for the software update; and determining, by the mesh node, a path through the mesh nodes to the one or more target mesh nodes as a function of the fingerprint data.

19. The method of claim 18, further comprising:

determining, by the mesh node, a criticality of the software update; and wherein determining the path through the mesh nodes comprises determining the path additionally as a function of the determined criticality of the software update.

20. The method of claim 18, wherein determining the path to the one or more target mesh nodes comprises determining the path additionally as a function of an energy cost for one or more of the mesh nodes to transmit the software update.

21. The method of claim 18, wherein obtaining the fingerprint data comprises obtaining a Bloom filter associated with each mesh node.

22. The method of claim 18, wherein determining the characteristics from the fingerprint data comprises determining at least one of a software version executed by each mesh node, a type of each mesh node, or one or more sensors included in each mesh node; and wherein determining one or more target mesh nodes comprises comparing characteristics of the software update to one or more of the software version, the type, and the one or more sensors of each mesh node.

23. The method of claim 18, further comprising sending, by the mesh node, the software update to the one or more target mesh nodes through the determined path.

24. The method of claim 18, wherein determining the path to the one or more target mesh nodes comprises determining the path additionally as a function of a network availability of one or more of the mesh nodes and as a function of a criticality of the software update.

25. The method of claim 24, further comprising:
   determining, by the mesh node, an expiration status of the fingerprint data of one or more of the mesh nodes; and
   adjusting, by the mesh node, the criticality of the software update as a function of the expiration status of the fingerprint data.

\* \* \* \* \*